United States Patent [19]

Bluestein

[11] Patent Number: 4,599,374

[45] Date of Patent: Jul. 8, 1986

[54] SOLVENT RESISTANT VULCANIZABLE SILICONE RUBBER COMPOSITIONS MADE WITH FLUOROSILICONE HYDRIDE CROSS LINKING AGENTS

[75] Inventor: Ben A. Bluestein, Schenectady, N.Y.

[73] Assignee: General Electric Co., Waterford, N.Y.

[21] Appl. No.: 416,415

[22] Filed: Sep. 2, 1982

[51] Int. Cl.$^4$ .............................................. C08L 83/00
[52] U.S. Cl. ................................. 523/213; 523/212; 523/214; 524/413; 524/425; 524/430; 524/431; 524/432; 524/433; 524/445; 524/424; 524/452; 524/500; 525/478; 528/31
[58] Field of Search ............................ 525/478; 528/31; 523/212, 213, 214; 524/500, 425, 445, 424

[56] References Cited

U.S. PATENT DOCUMENTS

| | | | |
|---|---|---|---|
| 3,006,878 | 10/1961 | Talcott | 525/102 |
| 3,069,378 | 12/1962 | Prober | 525/102 |
| 3,127,433 | 3/1964 | Tarrant | 528/42 |
| 3,179,619 | 4/1965 | Brown | 524/860 |
| 3,328,349 | 6/1967 | Lentz | 528/31 |
| 3,338,847 | 8/1967 | Nitzsche et al. | 525/478 |
| 3,436,366 | 4/1969 | Modic | 524/862 |
| 3,661,833 | 5/1972 | Larson | 524/588 |
| 3,697,473 | 10/1972 | Polmanteer et al. | 524/862 |
| 3,957,713 | 5/1976 | Jeram et al. | 260/32.85 B |
| 3,974,122 | 8/1976 | Sato et al. | 524/500 |
| 3,983,298 | 9/1976 | Hahn et al. | 428/355 |
| 4,029,629 | 6/1977 | Jeram | 523/203 |
| 4,032,502 | 6/1977 | Lee et al. | 523/212 |
| 4,041,010 | 8/1977 | Jeram | 524/16 |
| 4,045,390 | 8/1977 | Itoh et al. | 524/267 |
| 4,162,356 | 7/1979 | Grenoble | 528/31 |
| 4,189,545 | 2/1980 | Modic | 521/131 |
| 4,196,273 | 4/1980 | Imai et al. | 528/15 |
| 4,222,983 | 9/1980 | August et al. | 264/220 |
| 4,311,739 | 1/1982 | Hardman et al. | 427/387 |

*Primary Examiner*—Wilbert J. Briggs, Sr.
*Attorney, Agent, or Firm*—Gary L. Loser

[57] ABSTRACT

Solvent resistant, vulcanizable silicone rubber compositions are improved by using a class of hydrosiloxy (silicon hydride) polymer cross-linking agents in a blend of a vinyl-containing polymer, a suitable catalyst and a siloxane resin. One hydrosiloxy polymer cross-linking agent is a copolymer having about 0.75 to about 3.0 moles of $R_2HSiO_{0.5}$, about 0.37 to about 1.5 moles of $R''SiO_{1.5}$, and about 0.5 to about 1.5 moles of $SiO_2$, wherein R is selected from the group consisting of alkyl radicals of 1 to about 8 carbon atoms and phenyl; and R'' is a $(-CH_2-)_aR'$ radical where R' is perfluoroalkyl of 1 to about 8 carbon atoms, a is at least 2 but less than 10, and $(-CH_2-)$ is straight or branched chain; and the copolymer has a viscosity of about 30 to about 4,000 centipoise at 25° C.

38 Claims, No Drawings

SOLVENT RESISTANT VULCANIZABLE SILICONE RUBBER COMPOSITIONS MADE WITH FLUOROSILICONE HYDRIDE CROSS LINKING AGENTS

BACKGROUND OF THE INVENTION

The present invention relates to solvent resistant vulcanizable silicone rubber compositions, and more particularly, the present invention relates to an improved one- or two-component room temperature vulcanizable silicone rubber composition having vinyl-chain stopped units and fluorinated substituent groups. The polymers are cured in the presence of a catalyst with a hydrosiloxy polymer cross-linking agent having fluorinated substituent groups in the polymer, to form solvent resistant elastomers.

Silicone elastomers are well known in the art and are used for many applications in which high and low temperature stability are desired.

One class of solvent resistant room temperature vulcanizable silicone rubbers is disclosed in U.S. Pat. No. 4,041,010 which is incorporated herein by reference. The solvent resistant room temperature vulcanizable silicone rubber compositions disclosed and claimed in U.S. Pat. No. 4,041,010 comprise (A) 100 parts of a mixture composed of (i) 100 parts of a vinyl-containing polymer of the formula,

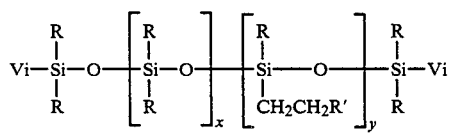

(1)

where Vi is vinyl, R is selected from the class consisting of alkyl radicals of 1 to 8 carbon atoms and phenyl, R' is perfluoroalkyl of 1 to 8 carbon atoms, x and y are at least 1, and the viscosity of the compound varies from 1,000 to 500,000 centipoise at 25° C., and the concentration of the siloxy units taken y times varies from 5 to 98 mole percent; (ii) from 1 to 60 parts of a vinyl-containing resin selected from the class consisting of a resin having ViRR"SiO$_{0.5}$ units and SiO$_2$ units where the hydrocarbon substituent to Si ratio varies from 0.8 to 2.7; a resin having ViRR"SiO$_{0.5}$ units, SiO$_2$ units and RR"SiO units where the hydrocarbon substituent to Si ratio varies from 0.8 to 2.4; a resin having ViR$_2$SiO$_{0.5}$ units, R$_2$R"SiO$_{0.5}$ units, SiO$_2$ units and RR"SiO units where the hydrocarbon substituent to Si ratio varies from 0.8 to 2.4; and a resin having R$_2$R"SiO$_{0.5}$ units, SiO$_2$ units and ViR"SiO units where the hydrocarbon substituent to Si ratio varies from 0.8 to 2.4, where Vi and R are as previously defined, R" is selected from the class consisting of alkyl radicals of 1 to 8 carbon atoms, phenyl radicals and —CH$_2$CH$_2$R' radicals, where R' is as previously defined; (iii) from 0.1 to 50 parts per million of the total composition of a platinum catalyst; and (B) from 1 to 50 parts based on 100 parts of the mixture of (A) of a cross-linking polymer selected from the class consisting of (iv) a resin having

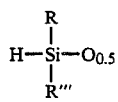

(2)

units and SiO$_2$ units where the R+R'''+H to Si ratio varies from 1.0 to 2.7; (v) a resin having

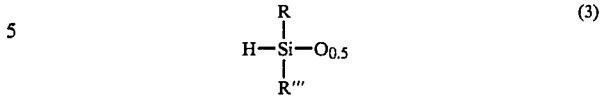

(3)

units, SiO$_2$ units and RR'''SiO units where the R+R'''+H to Si ratio varies from 1.2 to 2.7 and (vi) a polymer of the formula

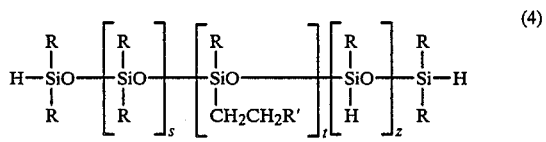

(4)

and mixtures thereof and where the concentration of the units taken t times varies from 0 to 75 mole percent; where R and R' are as previously defined, s is at least 1, t and z may be zero or a positive integer, and the viscosity of the polymer varies from 10 to 1000 centipoise at 25° C., and R''' is selected from the class consisting of alkyl radicals of 1 to 8 carbon atoms and —CH$_2$CH$_2$R' radicals.

Another class of solvent resistant room temperature vulcanizable silicone rubbers is disclosed in U.S. Pat. No. 4,029,629 which is incorporated herein by reference. The solvent resistant room temperature vulcanizabale silicone rubber compositions disclosed and claimed in U.S. Pat. No. 4,029,629 comprise: (A) 100 parts of a mixture composed of (i) 100 parts of a vinyl-containing polymer of the same formula designated as formula (1) above, where Vi, R, R', x and y are the same as defined for formula (1) above and the viscosity and the concentration of siloxy units taken y times is the same as defined for formula (1) above; (ii) from 0.1 to 50 parts per million of the total composition of a platinum catalyst; and (B) from 1 to 50 parts based on 100 parts of the mixture of (A) of a cross-linking polymer selected from the class consisting of (iii) a resin having

(5)

units and SiO$_2$ units where the R+H+R" to Si ratio varies from 1.0 to 2.7; (iv) a resin having

(5)

units, SiO$_2$ units and RR"SiO units where the R+H+R" to Si ratio varies from 1.2 to 2.7; and (v) a polymer having the same formula designated as formula (4) above and mixtures thereof where the concentration of the units taken t times varies from 0 to 75 mole percent, where R and R' are as previously defined, s is at least 1, t and z may be 0 or a positive integer, and the viscosity of the polymer varies from 10 to 1000 centipoise at 25° C., and R" is selected from the class consisting of alkyl radicals of 1 to 8 carbon atoms and —CH$_2$CH$_2$R' radicals. In U.S. Pat. No. 4,029,629, the vinyl-containing polymer of formula (1) may optionally contain from 1 to 85 parts per 100 parts of polymer (i) of a vinyl-containing compound of the formula:

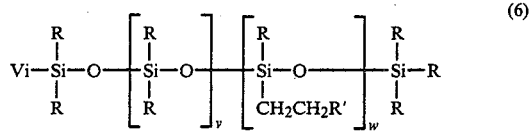
(6)

where R, Vi and R' are as previously defined; v and w are at least 1, and the concentration of the Vi(R)$_2$SiO$_{0.5}$ units with respect to the total terminal units in the polymer varies from 20 to 100 mole percent, and the viscosity of the polymer ranges from 100 to 20,000 centipoise at 25° C. In formula (6), v and w are positive integers of at least 1, and generally v varies from 1 to 800, and w varies from 1 to 800 such that the final viscosity of the polymer at 25° C. can vary from about 1,000 to about 2,000,000 centipoise and preferably from about 1,000 to about 500,000 at 25° C.

The foregoing compositions described and claimed in U.S. Pat. No. 4,041,010 and U.S. Pat. No. 4,029,629 overcome many prior art deficiencies by having superior solvent resistance to hydrocarbon fluids, good physical properties and a fast cure rate at elevated temperatures even though the compositions are SiH-olefin platinum catalyzed silicone rubber compositions having fluorinated substituent radicals.

Although the elastomers of U.S. Pat. Nos. 4,041,010 and 4,029,629 have good elastomer properties, it is desirable to improve the properties of the elastomers for various uses. For example, it is desirable in most instances to improve the miscibility of the fluid/resin blends and to obtain clear solutions which show no tendency to separate into layers upon standing. It is also desirable to obtain cured elastomers which are clear. Furthermore, it is desirable to overcome the deficiency found in many of the prior art fluid/resin blends and cured elastomers (a) in which cloudy mixtures are obtained; (b) in which the components separate upon standing; and (c) wherein the elastomers appear somewhat cloudy or hazy.

SUMMARY OF THE INVENTION

Accordingly, it is an object of the present invention to provide solvent resistant vulcanizable silicone rubber compositions having improved properties and a process for making the improved solvent resistant vulcanizable silicone rubber compositions.

It is another object of the present invention to provide a catalyzed SiH-olefin vulcanizable silicone rubber composition having solvent resistance and improved elastomer properties.

Still another object of the present invention is to provide a solvent resistant vulcanizable silicone rubber composition and method for making the solvent resistant vulcanizable silicone rubber composition which has improved clarity in the fluid composition and improved clarity in the cured solid composition.

Another object of the present invention is to provide a solvent resistant vulcanizable silicone rubber composition fluid and a method for making the solvent resistant vulcanizable silicone rubber composition fluid which does not separate upon standing prior to curing.

These and other objects of the invention will become apparent from the following description.

In accordance with the foregoing objects, there is provided a solvent resistant vulcanizable silicone rubber composition having improved clarity as a fluid and as a cured rubber and which does not separate upon standing in the fluid, uncured state by using fluorosilicone-hydride cross-linking agents which are copolymers, having substantially high fluorine concentrations relative to the hydride concentration in the curing of catalyzed SiH-olefin vulcanizable silicone rubber compositions. More specifically, there is provided in accordance with the present invention, a solvent resistant vulcanizable silicone rubber composition comprising: (A) 100 parts of a mixture comprised of:

(i) 100 parts of a vinyl-containing polymer of the formula,

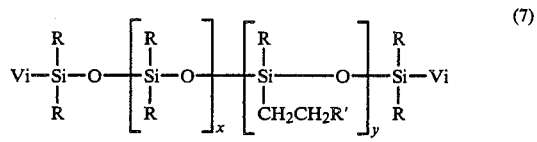
(7)

where Vi is vinyl, R is selected from the group consisting of alkyl radicals of 1 to about 8 carbon atoms and phenyl, R' is perfluoroalkyl of 1 to about 8 carbon atoms, x is at least 1, and y is at least 10, and the viscosity of the compound is at least 300 centipoise at 25° C., and the concentration of siloxy units taken y times varies from about 5 to about 98 mole percent;

(ii) from about 1.0 to about 60 parts of a resin having SiO$_2$ units; a siloxane having a fluorinated alkyl substituent selected from the group consisting of R"SiO$_{1.5}$ units, RR"SiO units, R$_2$R"SiO$_{0.5}$ units and mixtures thereof; and vinyl-containing siloxane units selected from the group consisting of ViRR"SiO$_{0.5}$, ViR$_2$SiO$_{0.5}$, ViR"SiO, ViRSiO, and mixtures thereof; where the hydrocarbon substituent to Si ratio varies from about 0.8 to about 2.4; Vi is vinyl; R is selected from the group consisting of alkyl radicals of 1 to about 8 carbon atoms and phenyl; R" is a (—CH$_2$—)$_a$R' radical where R' is perfluoroalkyl of 1 to about 8 carbon atoms, a is at least 2 but less than 10 and (—CH$_2$—)$_a$ is straight or branched chain;

(iii) a suitable amount of catalyst capable of promoting the cure of the mixture; and (B) from about 1 to about 50 parts, based on 100 parts of the mixture (A), of a cross-linking polymer having about 0.75 to about 3.0 moles of R$_2$HSiO$_{0.5}$, about 0.37 to about 1.5 moles of R"SiO$_{1.5}$, and about 0.5 to about 1.5 moles of SiO$_2$, wherein R is selected from the group consisting of alkyl radicals of 1 to about 8 carbon atoms and phenyl; and R" is a (—CH$_2$—)$_a$R' radical where R' is perfluoroalkyl of 1 to about 8 carbon atoms, a is at least 2 but less than 10, and (—CH$_2$—)$_a$ is straight or branched chain.

The cross-linking polymers are copolymers preferably prepared by the hydrolysis of halosilanes. The cross-linking polymers generally have a viscosity which varies from about 10 to about 5,000 centipoise at 25° C., and more preferably, from about 30 to about 4,000 centipoise at 25° C. As used herein, the cross-linking polymers are referred to interchangeably as fluorosilicone-hydrides, hydride cross-linking copolymers having fluorinated alkylsiloxy units, hydrosiloxy (silicon hydride) polymer cross-linking agents having high fluorine content relative to hydride content and the like.

It has been discovered that if the fluorosilicone hydride cross-linking agents of formula (8) are used as component (B) in the foregoing composition, the resulting silicone elastomers or rubbers have properties similar to those of the prior art silicone elastomers with a marked improvement in the clarity of the solutions obtained during mixing and with a tendency of the solution to maintain its integrity, that is, there is little or no tendency of the fluids containing the cross-linking polymers of the present invention to separate upon standing. Furthermore, it has also been discovered that the cured elastomers are clear. This is in contrast to the results obtained by using the hydride cross-linking agents of the prior art with the various fluorosilicone blends where cloudy mixtures are obtained which separate upon standing, as set forth in U.S. Pat. Nos. 4,029,629 and 4,041,010.

The catalyst capable of promoting the cure of the mixture may be any of the well-known catalysts, and it may be used in a suitable amount to cure the vulcanizable mixture. For example, both platinum and rhodium catalysts may be used in the process and composition of the present invention, and many well-known platinum and rhodium catalysts are disclosed in the prior art. The preferred catalysts are platinum in the form of a soluble platinum complex. In addition, in certain preferred embodiments, it may be desirable to use a cure inhibitor in the composition to extend the work life of the composition at room temperature.

The composition may be simply cured by mixing the hydride cross-linking agent (B) into mixture (A) and allowing the composition to cure either at room temperature, or if desired, at low elevated temperatures, whereupon at the low elevated temperatures, that is, above room temperature and even above about 100° C., the composition cures to an elastomer in a very short period of time. Thus, the compositions may be described as room temperature or low temperature vulcanizable silicone rubbers.

Generally, the composition as manufactured and prior to use, is formed in two components where the base vinyl-containing polymers, resin, optional fillers and catalysts are prepared in one component or package, and the hydride cross-linking agent of the present invention is prepared in the second component or package. When the end user decides to utilize the composition to fabricate various parts, the two components are simply mixed together in the preferred concentrations, and the mixture is allowed to cure to form the solvent resistant silicone rubber composition of the present invention. However, it can also be described as a one-component vulcanizable silicone rubber composition when it is inhibited.

It can be realized that various forms of mixing of various of the ingredients can be carried out in accordance with the process of the present invention. For example, portions of the vinyl-containing resin and the vinyl-containing polymer, as well as the filler, may be incorporated into the second component with the hydride cross-linking agent, as desired, without detracting from the usability of the composition or from the final physical properties of the composition. It is only necessary in forming the two components that the catalyst be inserted in the first component, that is, along with the vinyl-containing polymer and the optional vinyl-containing resin, or that the catalyst be used separately as a third component.

In certain preferred embodiments of the present invention, to give the final composition of the vinyl-containing polymer of formula (7) the proper processability, there may be incorporated in the composition from about 1 to about 85 parts of a vinyl-containing compound of formula (6) as defined above and in U.S. Pat. No. 4,029,629.

In accordance with the objects of the present invention, there is also provided a process for making solvent resistant silicone elastomers comprising, (a) mixing (A) 100 parts of a mixture comprised of (i) 100 parts of vinyl-containing polymer of formula (7) wherein Vi, R, R', x, y, viscosity and concentration of siloxy units are the same as defined for formula (7); (ii) from about 1.0 to about 60 parts of a resin having $SiO_2$ units; a siloxane having fluorinated alkyl groups selected from the group consisting of $R''SiO_{1.5}$ units, $RR''SiO$ units, $R_2R''SiO_{0.5}$ units and mixtures thereof; and vinyl-containing siloxane units selected from the group consisting of $ViRR'SiO_{0.5}$, $ViR_2SiO_{0.5}$, $ViR''SiO$ and mixtures thereof; where the hydrocarbon substituent to Si ratio varies from about 0.8 to about 2.4; Vi is vinyl; R is selected from the group consisting of alkyl radicals of 1 to about 8 carbon atoms and phenyl; R'' is a $(-CH_2-)_aR'$ radical where R' is perfluoroalkyl of 1 to about 8 carbon atoms, a is at least 2 but less than 10, and $(-CH_2-)_a$ is a straight or branched chain; and (iii) a suitable amount of catalyst capable of promoting the cure of the mixture; with (B) from about 1 to about 50 parts, based on 100 parts of the mixture (A), of a cross-linking polymer wherein R, R', R'', and $(-CH_2-)_aR'$ are the same as defined above; and (b) allowing the mixture to cure.

DETAILED DESCRIPTION OF THE INVENTION

Component (A) has been discussed in detail in U.S. Pat. Nos. 4,041,010, 4,029,629 and in the co-pending patent application filed herewith by Bluestein and entitled: "Improved Solvent Resistant Room Temperature Vulcanizable Silicone Rubber Composition" Ser. No. 414,226 filed 09/02/82.

In the vinyl-containing polymer having formula (7) above, R is generally selected from alkyl radicals of 1 to about 8 carbon atoms and phenyl radicals. Preferably, R is an alkyl radical of 1 to 3 carbon atoms, such as, methyl, ethyl and propyl. R' in the above formula (7) is a perfluoroalkyl radical of 1 to about 8 carbon atoms, and R' is most preferably $CF_3$. In the above formula (7), x may vary from 1 to about 1,000. It is only necessary that x be at least 1 and y at least 10, and such that the viscosity of the final polymer may vary from about 1,000 to about 2,000,000 centipoise at 25° C., and preferably varies from about 1,000 to about 500,000 centipoise at 25° C. In accordance with the present invention, the viscosity of the above compound in formula (7) itself is at least 300 centipoise at 25° C., and the concentration of siloxy units taken y times varies from about 5 to about 98 mole percent in the total polymer, and preferably, the concentration of the siloxy units taken y times varies from 30 to 98 mole percent. The polymers of foregoing formula (7) may be made by a variety of ways. In preferred embodiments, they are generally made by the process which comprises reacting alkyl cyclic siloxanes, such as, octaalkylcyclotetrasiloxanes, with alkyl fluoroalkyl cyclic polysiloxanes, such as, alkyltrifluoromethylethylcyclopolysiloxanes and vinyldialkylsiloxy-containing polysiloxanes, at temperatures between 0° C. and 200° C. in the presence of a catalyst, which is preferably potassium hydroxide or silanolate.

To control the viscosity of the final polymer having the foregoing formula, such that it has the desired end viscosity, there is incorporated into the equilibration mixture, as mentioned above, chain-stoppers which are disiloxanes or trisiloxanes or low molecular weight linear polysiloxanes which have terminal vinyl-containing siloxy units. The resulting mixture is equilibrated at the temperatures specified above for a sufficient period of time such that equilibrium is reached. At equilibrium, there is at least 50 percent conversion of the cyclosiloxanes to the linear polymer. At the point the catalyst is neutralized, and the cyclosiloxanes are stripped off, the desired polymer of formula (7) is obtained. Other methods of producing such a polymer are also well-known in the art, including the teachings of U.S. Pat. No. 2,979,519.

To give the final composition of formula (7) the proper processability, there may optionally be incorporated in the composition of formula (7) or in component (A) up to about 85 parts of a vinyl-containing compound having formula (6) wherein R, Vi, R', the concentration of the Vi(R)$_2$SiO$_{0.5}$ units and the viscosity are as defined above for formula (6). The use of the vinyl-containing compound of formula (6) is described in detail in U.S. Pat. No. 4,029,629. As with formula (7), formula (6) must have the alkyl perfluoroalkylethyl siloxy units taken w times and be at such a concentration that the fluoro-substituted groups in the total polymer vary from 5 to 98 mole percent, and more preferably, for optimum solvent resistant properties, vary from about 30 to about 98 mole percent. In formula (6) as defined above, v and w are positive integers of at least 1, and generally v varies from 1 to 800, and w varies from 1 to 800 such that the final viscosity of the polymer at 25° C. can vary from about 1,000 to about 2,000,000 centipoise and preferably varies from about 1,000 to about 500,000 centipoise at 25° C.

The vinyl-containing siloxane resin of (A)(ii) may be formed by various methods well-known in the art. The resin may contain R"SiO$_{1.5}$ units as described in Bluestein's co-pending patent application assigned to the instant assignee and entitled "Improved Solvent Resistant Room Temperature Vulcanizable Silicone Rubber Composition" Ser. No. 414,226, filed 09/02/82, now U.S. Pat. No. 4,529,752, or the resin may contain RR"SiO units or R$_2$R"SiO$_{0.5}$ units as described in U.S. Pat. No. 4,041,010 and mixtures of the foregoing, wherein R" is a (—CH$_2$—)$_a$R' radical where R' is perfluoroalkyl of 1 to about 8 carbon atoms; a is at least 2 but less than 10; (—CH$_2$—)$_a$ is straight chain or branched chain; and R is selected from the group consisting of alkyl radicals of 1 to about 8 carbon atoms and phenyl. In preferred embodiments, the R' of components (A)(ii) is —CF$_3$, and a is 2. Thus, R" would be beta-trifluoromethyl ethyl radical. In certain other preferred embodiments, the R"SiO$_{1.5}$ units of component (A)(ii) are derived from perfluoroalkylalkyltrihalosilanes, such as, trifluoromethylethyltrichlorosilane. Examples of beta-perfluoroalkylethyl radicals which may be used in the resin component of the present invention, and which may be derived from, for example, the corresponding perfluoroalkylalkyltrichlorosilane, include beta-trifluoromethyl-n-propyl radical, beta-perfluoroethylethyl radical, beta-perfluorobutylethyl radical, beta-perfluoroheptylethyl radical, and the like.

In other embodiments, the RR"SiO units of component (A)(ii), and the R$_2$R"SiO$_{0.5}$ units of component (A)(ii) may be derived from the corresponding halosilanes, including R"R$_n$SiX$_{3-n}$ where R and R" are as previously defined, X represents a halogen atom, and n may vary from 1 to 2. These are well defined in U.S. Pat. No. 4,041,010, not only for the component, R"R$_n$SiX$_{3-n}$, but also for those components having the formula, ViR$_n$SiX$_{3-n}$ and ViR"$_n$SiX$_{3-n}$. Any of a large group of compounds may be used to prepare the resin, including, for example, vinyldimethylchlorosilane, vinyldimethylethoxysilane, divinyltrifluoropropylisopropoxysilane, phenyldimethylchlorosilane, vinylmethyldichlorosilane, methyltriethoxysilane, trifluoropropyldimethylchlorosilane, trifluoropropylmethyldichlorosilane and the like.

Any suitable method may be used for preparing the desired resins of the present invention as described in U.S. Pat. No. 4,041,010.

In one preferred embodiment, and by the process of the present invention, the siloxane resin component (A)(ii) is derived from the catalyzed hydrolysis of a blend of a trialkylhalosilane; a vinyldialkylhalosilane; a halosilane having at least one perfluorinated carbon atom and having the formula X$_3$—Si(—CH$_2$)$_a$R', where R' is perfluoroalkyl of 1 to about 8 carbon atoms, a is at least 2 but less than 10, (—CH$_2$)$_a$ is straight chain or branched, and X is a halogen; and a condensed alkyl silicate. In the process of the present invention, the preferred perfluorinated halosilane is trifluoropropyltrichlorosilane; the trialkylhalosilane is trimethylchlorosilane; and the vinyldialkylhalosilane is vinyldimethylchlorosilane. For example, in certain preferred embodiments, the siloxane resin contains the compound derived by hydrolysis of a compound having the formula R'(—CH$_2$—)$_a$Si—X$_3$, where R' is perfluoroalkyl of 1 to about 8 carbon atoms, a is at least 2 but less than 10, (—CH$_2$—)$_a$ is straight or branched chain, and X is a halogen, such as, chlorine, or the resin contains the compound derived by the hydrolysis of the halosilanes described in U.S. Pat. No. 4,041,010. After the controlled hydrolysis of the foregoing halosilane, R'(—CH$_2$—)$_a$Si—X$_3$, having at least one perfluorinated carbon atom, the solvent resistant room temperature vulcanizable silicone rubber composition contains a resin comprising R"SiO$_{1.5}$ units wherein R" is a (—CH$_2$—)$_a$R' radical where R' is perfluoroalkyl of 1 to about 8 carbon atoms, a is at least 2 but less than 10, and (—CH$_2$—)$_a$ is straight or branched chain, and the silicon atom has a tri-functional group designated herein as 1.5 oxygen atoms on the silicon atom. This tri-functional siloxane is generally known in the art as a silsesquioxane, and each of the oxygen atoms upon the silicon atom is shared with one other silicon atom.

In one preferred method of forming the desired resin which may be used in the present invention, the halosilane having at least one perfluorinated carbon atom and having the formula X$_3$—Si(—CH$_2$)$_a$R', wherein R', a and X are defined above, is blended with an appropriate vinyl-containing substituent, such as, ViRR"SiCl, ViRSiCl$_2$, ViR$_2$SiCl, ViR"SiCl$_2$ and mixtures thereof along with a condensed alkylsilicate or alkyl orthosilicate.

Various mixtures of the foregoing halogen-containing silanes may be used in the controlled hydrolysis method of the present invention. For example, various of the foregoing halosilanes and orthosilicates may be mixed to provide a resin having, for example, ViRR"SiO$_{0.5}$ units, SiO$_2$ units and R"SiO$_{1.5}$ units where the hydrocarbon substituent to Si ratio varies from about 0.8 to about 2.4; ViR$_2$SiO$_{0.5}$ units, SiO units, R$_2$R"SiO$_{0.5}$ units and R"SiO$_{1.5}$ units where the hydrocarbon substituent to Si ratio varies from about 0.8 to about 2.4; ViR$_2$SiO$_{0.5}$ units, SiO$_2$ units, R$_2$R"SiO$_{0.5}$, ViR"SiO units and R"Si- $O_{1.5}$ units; and $ViR''SiO$ units, $SiO_2$ units and $R''SiO_{1.5}$ units and the like. The foregoing resins may also optionally contain $R_3SiO_{0.5}$ units. Although the resin component and the polymer component must contain vinyl-containing units, the vinyl concentration of the resin and the vinyl concentration of the polymer are not critical as long as the resin and the polymer are compatible and form the improved solvent resistant silicone elastomers.

In one process of the present invention, the halogen compounds discussed above, for example, a trialkylhalosilane, a vinyldialkylhalosilane and halosilane having the formula $X_3-Si(-CH_2-)_aR'$ as defined above, are reacted with a condensed alkyl silicate, for example, ethyl orthosilicate, to provide the desired resins. From about 1 to about 60 parts of the vinyl-containing resin are added to 100 parts of the vinyl-containing polymer. A solution of the halosilanes in an inert non-alcoholic organic solvent is formed in which the organic solvent is insoluble or substantially insoluble in water and is selected from the class consisting of (1) aliphatic and aromatic liquid hydrocarbons (2) liquid ethers containing at least 4 carbon atoms (3) esters, and the like. This solution is gradually added to a two-phase hydrolyzing medium comprising a mixture of water in an amount considerably in excess of that calculated as the amount required to hydrolyze the silane. Solvents such as, butyl acetate and ethyl acetate, can be utilized. Ethyl acetate and butyl acetate are the preferred non-alcoholic solvents for the silane derivatives. Most types of ketone solvent, such as, acetone, and various chlorinated hydrocarbon solvents may also be utilized.

The halosilanes and orthosilicate are dissolved in the solvent, and then water is added. The mixture is vigorously stirred during the reaction which is exothermic. After the reaction has proceeded to completion, the agitation is discontinued, and the reaction mixture is allowed to separate into two layers. The lower aqueous layer is removed, and the organic layer is stripped to reduce the acid. To the resin solution there is added solvent as is necessary and 100 to 1000 parts per million of an alkali metal hydroxide, such as, potassium hydroxide. The resulting mixture is heated to from 50° C. to 200° C. for 2 to 4 hours until the silanol content of the resin is lowered to below 0.5 weight percent. The alkali metal hydroxide is then neutralized, and some of the solvent may be stripped off to yield the desired resin in solution. Although it is not necessary to so body the vinyl-containing resins of the present composition, it has been found that the compositions with the best physical properties are obtained where the silanol content of the resins is below 0.5 weight percent.

In addition to the vinyl content of the resin, it is preferred that the resin contain some $-CH_2CH_2R'$ substituent groups where R' is as previously defined. Accordingly, in the formula of such resins, R'' is preferably selected from the class consisting of alkyl radicals of 1 to 8 carbon atoms, phenyl radicals or $-CH_2CH_2R'$ radicals. Preferably, the $(R)R'CH_2CH_2SiO$ mole percent siloxy content in the resin is the same as the concentration of such units in the polymer of (A)(i), and amost preferably, it is within 10-20 mole percent of the concentration of such units in the polymer of the formula of (A)(i).

As indicated above, the siloxane resin components (A)(ii) may be derived by hydrolysis of the halosilanes described in U.S. Pat. No. 4,041,010. For example, the siloxane having a fluorinated alkyl may be derived from a compound, such as, $RR''SiO$ units or $R_2R''SiO_{0.5}$ units where R and R'' are the same as defined above. For example, $RR''SiO$ units may be derived from a hydrolysis of trifluoromethylethylmethyldichlorosilane, and $R_2R''SiO_{0.5}$ units may be derived from the hydrolysis of trifluoropropyldimethylchlorosilane. The vinyl-containing siloxane units used in making the resin have been defined above and include those compounds which, upon hydrolysis, produce $ViRR''SiO_{0.5}$, $ViR_2SiO_{0.5}$, $ViR''SiO$ and mixtures thereof. These are defined in U.S. Pat. No. 4,041,010.

Another ingredient which must be present in the composition of the present invention, is a suitable amount of catalyst capable of promoting the cure of the one- or two-component mixture. That is, when component (A) and component (B) are mixed, the catalyst must be present in a sufficient amount to promote the cure of the mixture in the formation of the solvent resistant silicone rubber composition. Generally, a sufficient amount of the catalyst is between about 0.1 to about 50 parts per million of the total composition, however, one skilled in the art can determine that amount of catalyst required to affect the desired cure of the two components. The foregoing concentration is designated in parts by weight of catalyst present in the total composition. The catalyst which may be utilized in the present composition and process, may be any suitable catalyst known to cure vinyl-containing siloxanes, for example, conventional platinum catalysts and rhodium catalysts may be utilized in the present composition and process. In most of the prior art, platinum catalysts are preferred, and accordingly, platinum catalysts are discussed in detail herein.

The platinum catalysts which may be utilized in the present process and composition, may be platinum deposited on a solid carrier, such as, platinum on charcoal or platinum on gamma alumina, or it may be solubilized platinum complex. The solubilized platinum complexes are preferred in the present composition since they are more reactive.

Preferred platinum catalysts are those platinum compound catalysts which are soluble in the present reaction mixture. The platinum compound can be selected from those having the formula $(PtCl_2.Olefin)_2$ and $H(PtCl_3.Olefin)$ as described in U.S. Pat. No. 3,159,601. The olefin shown in the previous two formulas can be almost any type of olefin but is preferably an alkene having from 2 to 8 carbon atoms, a cycloalkene having from 5 to 7 carbon atoms or styrene. Specific olefins utilizable in the above formulas are ethylene, propylene, the various isomers of butylene, octylene, cyclopentene, cyclohexene, cycloheptene, and the like.

A further platinum containing material usable in the composition of the present invention is the platinum chloride cyclopropane complex $(PtCl_2.C_3H_6)_2$ described in U.S. Pat. No. 3,159,662.

Still further, the platinum containing material can be a complex formed from chloroplatinic acid with up to 2 moles per mole of platinum of a member selected from the class consisting of alcohols, ethers, aldehydes and mixtures of the above as described in U.S. Pat. No. 3,220,972.

The preferred platinum compound to be used not only as a platinum catalyst but also as a flame retardant additive is that disclosed in U.S. Pat. No. 3,775,452. Generally, this type of platinum complex is formed by reacting chloroplatinic acid containing 4 moles of water of hydration with tetravinylcyclotetrasiloxane in the presence of sodium bicarbonate in an ethanol solution.

The catalysts of U.S. Pat. Nos. 3,220,972 and 3,775,452 are preferred in the present composition since they are the most reactive, and because they permit an easily controlled cure rate. The catalyst of U.S. Pat. No. 3,775,452 which is the most preferred, is generally an alkenyl polysiloxane complexed with platinum, and it is substantially free of chlorine radicals. Generally, when the composition is prepared, the platinum catalyst is incorporated into the vinyl-containing polysiloxane of component (A) (i) as a separate first component or into the resin component (A)(ii) or both.

When it is desired to cure the composition, the hydride cross-linking agent of the present invention, that is, component (B), is added to or incorporated in the first component or component (A) containing the vinyl-containing siloxane polymer (i), the vinyl-containing siloxane resin (ii) and the catalyst (iii) to produce a cured silicone elastomer.

In accordance with the present invention, it has been discovered that from about 1 to about 50 parts, based upon 100 parts of the mixture (A) of a specific class of cross-linking polymer having a tri-functional group generally known in the art as a silsesquioxane therein, result in a clear solution which shows no tendency to separate upon standing, and when cured, the cured silicone elastomers are also substantially clear, without sacrificing any of the properties of the prior art siloxane elastomers, for example, without sacrificing hardness, tensile strength and/or elongation. The silicon atom in the $R''SiO_{1.5}$ moiety of the copolymer has a trifunctional group designated herein as 1.5 oxygen atoms on the silicon atom, and each of the oxygen atoms on the silicon atom is shared with one other silicon atom.

Generally, the cross-linking polymers in the composition and process of the present invention are fluorosilicone hydride polymers having about 0.75 to about 3.0 moles of $R_2HSiO_{0.5}$, 0.37 to about 1.5 moles of $R''SiO_{1.5}$, and about 0.5 to about 1.5 moles of $SiO_2$, designated herein as formula (8), wherein R is selected from the group consisting of alkyl radicals of 1 to about 8 carbon atoms and phenyl; and R'' is a $(-CH_2-)_aR'$ radical where R' is perfluoroalkyl of 1 to about 8 carbon atoms, a is at least 2 but less than 10, and $(-CH_2-)_a$ is straight or branched chain.

In certain preferred embodiments of the present invention, there are about 1.5 moles of $R_2HSiO_{0.5}$, about 0.75 mole of $R''SiO_{1.5}$, and about 1.0 mole of $SiO_2$.

The fluorosilicone hydride cross-linking agents of the present invention are polymeric, and generally have a viscosity of about 10 centipoise to about 5,000 centipoise at 25° C., and more preferably from about 30 centipoise to about 4,000 centipoise at 25° C., and the length of the siloxane is preferably about 10 to about 2,000 siloxane (—SiO—) units. The length of the polymer chain or the viscosity is not critical in the composition and process of the present invention, as long as there is a sufficient amount of the copolymer cross-linking agent to cure the solvent resistant vulcanizable silicone rubber composition.

In the cross-linking copolymers of the present invention $R_2HSiO_{0.5}$ is a dialkylhydrosiloxy unit; R''RSiO which may be optionally used, is an (alkyl)perfluoroalkylalkylsiloxy unit; $R''SiO_{1.5}$ is a perfluoroalkylalklylsiloxy unit; and $SiO_2$ is a siloxy unit. Thus, the crosslinking agent may be designated as a copolymer of dialkylhydrosiloxy/perfluoroalkylalkylsiloxy/siloxy units, or when it contains optional R''RSiO units, it may be designated as a copolymer of dialkylhydrosiloxy/(alkyl)-perfluoroalkylalkylsiloxy/perfluoroalkylalkylsiloxy/-siloxy units. Naturally, it is within the purview of one skilled in the art to produce and use as a cross-linking agent a hybrid wherein the cross-linking agent would contain R''RSiO as well as $R''SiO_{1.5}$ moieties, or alternatively, one skilled in the art could use a blend containing such cross-linking agents.

In one embodiment of the present invention, the dialkylhydrosiloxy/perfluoroalkylalkylsiloxy/siloxy copolymer is a cross-linking polymer having the formula:

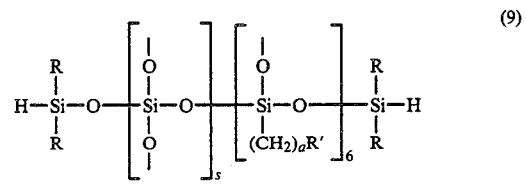
(9)

wherein R is selected from the group consisting of alkyl radicals of 1 to about 8 carbon atoms and phenyl; R' is a perfluoroalkyl radical of 1 to about 8 carbon atoms; a is at least 2 but less than 10; $(-CH_2-)_a$ is straight chain or branched chain; and s and t are about 10 to about 2,000, and the amount of $R_2HSi-$ is equal to or greater than t, and the viscosity is about 30 centipoise to about 4,000 centipoise at 25° C. One preferred hydrosiloxy cross-linking agent of formula (9) is the copolymer having the formula:

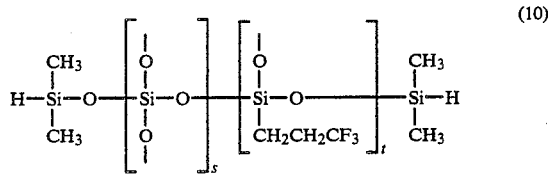
(10)

where s and t are about 10 to about 2,000, and the amount of $(CH_3)_2HSi-$ is equal to or greater than t, and the viscosity of the copolymer is about 30 centipoise to about 4,000 centipoise at 25° C.

In another embodiment of the present invention, the cross-linking agent may be a copolymer having the following formula:

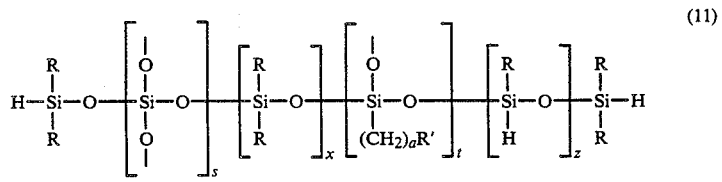
(11)

where R, R' and a are the same as defined above for formula (9), and where s and t are at least 10; x and z may be zero or a positive integer; and x+z is greater than t, and the viscosity of the copolymer varies from about 30 to about 4,000 centipoise at 25° C. Generally, there are between about 10 and about 2,000 siloxy units in the chain of formula (11), and in preferred embodiments, 50 mole percent of the siloxy units are made up of siloxy units taken "t" times. For example, x and z may be from 0 to about 1,000 but the total of x and z greatly exceeds t. In formulas (9), (10) and (11), the hydride portion or portions of the formula must be adequate to prevent gelation, thus, there must be a sufficient amount of the chainstopper so that the crosslinking agent will be a liquid.

Generally, there is utilized from 1 to about 50 parts of the hydride cross-linking copolymers of the present invention per 100 parts of the first component or component (A) of the composition, and more preferably, from about 1 to about 25 parts of the hydride cross-linking copolymer per 100 parts of the first component or component (A) are utilized.

As can be appreciated, the hydride cross-linking copolymers contain large concentrations of perfluoroalkylalkylsiloxy substitutent groups at a concentration similar to that found in the vinyl-containing polymer of component (A). As a result, the hydride cross-linking copolymers of the present invention are compatible with the other components of the composition, and accordingly, premixed compounds, especially those having inorganic fillers, tend to have substantially improved shelf stability because the cross-linking copolymers of the present invention do not separate upon standing. The hydride cross-linking copolymers having the high perfluoroalkyl content (relative to hydride content) of the present invention are compatible with and soluble in the resin/fluid siloxanes, and accordingly, mixtures of the hydride cross-linking copolymers of the present invention with the fluid/resin polymers are substantially clear, and no separation occurs on standing. This property permits the preparation of shelf-stable one-package elastomer compounds.

Generally, in the hydride polysiloxanes of the present invention, R may be an alkyl radical of 1 to 8 carbon atoms or phenyl or both, and R' is perfluoroalkyl. In the above formulas, the perfluoroalkylalkylsiloxy-containing unit varies from about 10 to about 2,000, and more preferably from about 10 to about 1,000. In formula (11) t is about 10 to about 2,000, and more preferably from about 10 to about 1,000. There is no upper limit intended for the number of perfluoroalkylalkylsiloxy-containing units, and thus no upper limit for t in formulas (9) through (11). The ultimate requirement for the concentration of the perfluoroalkylalkylsiloxy units in the crosslinking agent is to provide a sufficient amount of the perfluoroalkylalkylsiloxy units so that the crosslinking agent is a compatible reactant for the fluid-resin solution, that is, for component (A). A sufficient amount of the perfluoroalkylalkyl siloxy units in the crosslinking agent is that amount which cures the rubber without separating out from the other components with which it is mixed.

The hydride polysiloxanes of the present invention contain hydrogen atoms for cross-linking in the polymer chain to increase the degree of cure to obtain the resulting cured silicone elastomer as desired. Such hydrogen atoms in the polymer chain itself are not necessary to obtain the advantageous solvent resistant silicone elastomer of the present invention. For that reason, monoalkylhydrosiloxy units are not required in the chain, although in certain cases, as in formula (11), such units may be incorporated in the copolymer chain. Furthermore, it is not necessary to incorporate dialkylsiloxy units in the copolymer, however, as shown in formula (11), such units may also be incorporated in the copolymer. In any event, the values of the units in the copolymer chain must be such that the resulting hydride polysiloxane polymer of the present invention is a liquid and has a viscosity that may vary from about 10 to about 5,000 centipoise at 25° C., and more preferably from about 30 to about 4,000 centipoise at 25° C., and such that the polymer has a hydrogen content of anywhere from about 0.001% or less to about 1.0% by weight. As explained above, the hydride-containing polysiloxane cross-linking agent must contain perfluoroalkylalkylsiloxy substitutent groups, and generally, the concentration of the perfluoroalkylalkyl siloxy units in the polymer varies from about 20 mole percent to about 98 mole percent of the total substitutent groups, and most preferably varies from about 40 mole percent to about 98 mole percent.

The hydride polysiloxane copolymers of the present invention may be prepared by any conventional procedure including the equilibration procedure as set forth in U.S. Pat. No. 4,029,629. In the preparation of the hydride polysiloxane copolymers of the present invention an acid equilibration catalyst must be used such as, sulfuric acid. It is only necessary to obtain the hydride siloxy units in the polymer as desired to utilize in the equilibration procedure, tetraalkyltetrahydrocyclotetrasiloxanes, and also to utilize appropriate hydride-containing chain stoppers in the proper amounts to obtain the desired viscosity polymer.

The preferred method of forming the desired hydride copolymers of the present invention is by the controlled hydrolysis of the corresponding halosilane compounds, such as those having the formulas $R_2HSiX$, $R''RSiX_2$, $R''SiX_3$, $RHSiX_2$ and $R_2SiX_2$ where R and R'' have been defined above, and where X represents a halogen atom, such as, chlorine, and various combinations of the foregoing halosilanes are hydrolyzed with an alkyl orthosilicate, such as, ethyl orthosilicate, to provide the desired copolymers of the present invention above. For example, to provide a hydride copolymer cross-linking agent, $R_2HSiO_{0.5}$ is derived from $R_2HSiX$, such as, dimethylhydrochlorosilane; $R''SiO_{1.5}$ is derived from $R''SiX_3$, such as, trifluoromethylethyltrichlorosilane; and $SiO_2$ is derived from an alkylsilicate, such as, ethylsilicate. R and X are the same as defined above.

In the embodiment set forth in formula (10) the copolymer is derived from the controlled hydrolysis of dimethylhydrochlorosilane, ethyl silicate and trifluoromethylethyltrichlorosilane. Formula (11) is derived from the controlled hydrolysis of $R_2HSiX$, $R_2SiX_2$, $R''SiX_3$ and $RHSiX_2$, where R and X are the same as defined above, and an alkyl silicate.

Generally, a solution of the halosilane in an inert non-alcohol organic solvent, such as butyl acetate, is formed in which the organic solvent is insoluble or substantially insoluble in water and is selected from the class consisting of (1) aliphatic and aromatic liquid hydrocarbons, and (2) liquid ethers containing at least 4 carbon atoms (3) esters and many other solvents. This solution is gradually added to a hydrolyzing medium comprising a mixture of water in an amount considerably in excess of that calculated as having to hydrolyze the silane. Solvents, such as, ethyl and butyl acetate which are the preferred non-alcoholic solvents for the silane derivatives, can be used, and a ketone, such as, acetone and various others, may be used. The halosilanes are dissolved in the solvent, and water is added to the mixture. The mixture is vigorously stirred during the reaction which is exothermic. After the reaction has proceeded to completion, the agitation is discontinued, and the reaction mixture is allowed to separate into two layers. The lower aqueous layer is removed, and the organic layer is heated with the acid therein at temperatures at about 100° C. to about 175° C. for about 0.5 to about 6.0 hours until the silanol content of the polymer is less than 0.5 weight percent. Then the solvent is stripped off to yield the desired copolymer. It has been found that these hydride polysiloxane polymers result in a clear cured elastomer having good physical properties.

In another method of preparation, the hydride polysiloxane copolymers of the present invention may be prepared by reacting a silica hydrosol with the corresponding chlorosilanes or alkoxylated silanes and mixtures thereof wherein the chlorosilane has a hydride group. This method is described in U.S. Pat. No. 4,029,629 which is incorporated herein by reference. The silica hydrosols are prepared in the usual manner by neutralizing sodium silicate solutions. The silica hydrosol is simply mixed with the corresponding silanes and/or siloxanes to form the required hydride polysiloxane copolymer. More specific details as to this particular process can also be found in U.S. Pat. No. 2,676,182.

It must be noted that any of the hydride-containing copolymers can be used individually or mixtures thereof may be utilized as cross-linking agents with the vinyl polysiloxanes of component (A) defined above to produce the desired compositions of the present case.

The foregoing are the basic ingredients of the present composition, and the resulting substantially clear compositions in the uncured state will have viscosities varying anywhere from about 4,000 to about 500,000 centipoise at 25° C., and in more preferred embodiments from about 1,000 to about 200,000 centipoise at 25° C., and will have desirable physical properties even without the incorporation of a filler. However, in certain preferred embodiments of the present invention, a filler or a combination of fillers may be used in component (A), component (B) or both components.

Although reinforcing filler, such as, fumed silica and precipitated silica, may be added to the composition or the components thereof to impart reinforcing properties to the silicone elastomer composition, it is not necessary to use such fillers to achieve the reinforcing properties. Other filler materials may also be added to achieve reinforcing properties, and there may be added to the mixture or to one or both of the components (A) and (B) up to about 100 parts, and preferably from about 5 to about 100 parts, preferably in component (A), of a filler which is selected from the group consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, alpha quartz, calcined clay, asbestos, carbon, graphite, cork, cotton, synthetic fibers and the like. Although fumed and precipitated silica may be advantageously incorporated into the composition, in some cases they may be undesirable since they may unduly increase the viscosity of the final uncured composition. Most of the fillers mentioned above are extending fillers and may be advantageously added to increase the final cured physical properties of the composition without unduly increasing the viscosity of the composition prior to cure. If it is desired to increase certain physical properties, such as hardness or tensile strength, of the composition, there may preferably be utilized fumed silica or precipitated silica that has been treated, for example, as disclosed in U.S. patent No. 2,938,009 with cyclic polysiloxanes. Another method for treating fillers is disclosed in U.S. Pat. No. 3,024,125.

More specifically, the silazane treated fillers in accordance with the disclosure in U.S. Pat. No. 3,635,743 and U.S. Pat. No. 3,847,848, can be utilized as treated fillers in the composition of the present case.

Other well known additives which may be utilized in the composition of the present invention, are heat stabilizing agents and cure inhibitors. For instance, there may be utilized in component (A) from about 0.1 to about 5 parts of iron oxide and preferably, red iron oxide, which also acts as a pigment. The basic function of the iron oxide is to act as a heat stabilizing agent. Other types of pigments may be utilized in the composition.

In addition, it can be appreciated that the SiH-olefin platinum catalyzed compositions can cure at room temperature over prolonged periods of time, such as, 10 minutes to 12 hours, or they can cure at elevated temperatures in extremely short periods of time, for example, within a few seconds at temperatures above about 100° C.

To give the composition extended work life at room temperature, there may be incorporated into the composition a cure inhibitor. Thus, there may be incorporated into component (A) from about 100 to about 10,000 parts per million of a cure inhibitor which may advantageously be an alkenyl containing cyclic polysiloxane.

Examples of such cure inhibitors which may be utilized, are methylvinylcyclotetrasiloxane, methylallylcyclotrisiloxane, ethylallylcyclotetrasiloxane, and the like. With such a cure inhibitor in the composition, the present composition may have a work life at room temperature of anywhere from about 2 to about 16 hours. The advantages of such a cure inhibitor in the composition is that it allows the composition to be worked and processed in its low viscosity state to fabricate various parts and to give sufficient time to act on the composition prior to cure.

Although in preferred embodiments, composition component (A) contains the vinyl-containing polymer, the vinyl-containing resin and the platinum catalyst to form a single first component, and component (B) contains the hydride cross-linking agent of the present invention to form a single second component, the composition may be formulated in various ways. For instance, there may be some of the vinyl-containing resin of component (A)(ii), as well as the filler, mixed in with the hydride of the second component (B). It is only necessary that the catalyst be packaged or prepared in the first component along with some of the vinyl-containing polymer and, optionally, some of the vinyl-containing resin but with no hydride crosslinker therein. The cure inhibitor and the stabilizing agent, as well as other additives and pigments, are also preferably mixed into the first component since it is the largest part of the mass as compared to the second component, and since it facilitates mixing of the final composition.

To prepare the cured elastomer, the hydride cross-linking copolymer of the present invention is mixed into component (A) thoroughly, and the composition is utilized to form various fabricated parts or as an encapsulating compound. Then the composition, when it contains a cure inhibitor as explained above, can be cured at room temperature over extended periods of time. If for some reason the cure inhibitor is not desired, then the composition can be cured at elevated temperatures in a matter of a few seconds. More preferably, the composition is cured at room temperature over an extended period of time with the cure inhibitor in the composition to allow the composition to be utilized to fabricate various parts therefrom, such as, electrical connectors.

The examples below are given for the purpose of illustrating the invention and are not intended to define or limit the scope of the invention but are merely given for the purpose of exemplifying the manner of practicing the invention and of comparing the invention with the prior art compositions and processes. All parts in the present specification are designated as parts by weight unless otherwise specified.

PREPARATION OF CROSS-LINKING COPOLYMERS FOR COMPONENT (B)

Example 1

This example illustrates the preparation of a hydride polysiloxane cross-linking copolymer of the present invention. A blend of 70 grams of dimethylhydrochlorosilane, 84 grams of trifluoropropyltrichlorosilane, 102 grams of condensed ethyl silicate and 100 grams of butyl acetate was mixed in a 1-liter flask equipped with a stirrer, thermometer, addition funnel and reflux condenser. A total of 150 grams of water was added to the blend over a period of 34 minutes. The temperature of the blend rose to 52° C. After 45 minutes, the layers were separated, and the organic layer was washed two times with water. The organic layer was then heated in a flask for two hours to a pot temperature of 150° C. After filtration, the fluid was heated under vaccum to remove residual butyl acetate. A low viscosity fluid was obtained.

Example 2

A prior art hydride cross-linking copolymer having a high hydrogen content and no perfluoroalkylalkylsiloxy content was used as a comparative cross-linking agent. The hydride cross-linking agent had dimethylhydrosiloxy units derived from dimethylhydrochlorosilane, and silicon dioxide derived from condensed ethyl silicate. In a controlled hydrolysis reaction similar to that described in Example 1 above, a polymer was formed having a viscosity of about 300 centipoise at 25° C., and a hydride concentration of about 0.84% by weight.

PREPARATION OF RESINS FOR COMPONENT (A)

Example 3

A blend of 194 grams of trimethylchlorosilane, 54 grams of vinyldimethylchlorosilane, 517 grams of trifluoropropyltrichlorosilane, 461 grams of condensed ethyl silicate and 720 mls. of butyl acetate was placed in a flask equipped with a stirrer, a reflux condenser, a hydrogen chloride scrubber, a thermometer and an addition funnel. To this blend was added 290 mls of water during a 9 minute period to hydrolyze the mixture. The temperature rose by exothermic reaction to about 80° C., and the mixture was then stirred for an additional 30 minutes. The bottom layer was separated and heated in a flask equipped with a stirrer and take-off condenser. Distillate was removed until the pot temperature was 132° C., and the take-off temperature was 99° C. To the warm solution was added first 0.43 gram of 30 weight percent potassium hydroxide. The mixture was heated to boiling for 2.5 hours. Upon cooling, 0.57 gram of 85% phosphoric acid was added to give an acid mixture. The mixture was treated with Celite 345 and Fuller's Earth and pressure filtered. A clear fluid was obtained. This solution was an 80% resin solution in butyl acetate. The resin had molar ratio of 0.8 mole of trimethylsiloxy units, 0.2 mole of vinyldimethylsiloxy units, 1.0 mole of trifluoropropylsiloxy units per 1.0 mole of silicon dioxide units.

Example 4

A resin having a molar ratio of 0.65 mole trimethylsiloxy units, 0.15 mole vinyl dimethylsiloxy units, 1.0 mole trifluoropropylsiloxy units and 1.0 mole of silicon dioxide units was prepared by hydrolyzing a blend of 53 grams of trimethylchlorosilane, 13.5 grams of vinyldimethylchlorosilane, 172 grams of trifluoropropyltrichlorosilane and 154 grams of ethyl silicate in 240 mls. of butyl acetate. The mixture was hydrolyzed and treated as set forth in Example 3 above.

Example 5

Another resin was prepared in accordance with the procedure of Example 3 using molar ratios of 0.8 mole of trimethylsiloxy units, 0.15 mole of vinyldimethylsiloxy units, 0.5 mole trifluoropropylsiloxy units and 1.0 mole of silicon dioxide units. The blend was prepared as a 70% solution in butyl acetate. A clear fluid was obtained.

PREPARATION OF FLUID/RESIN BLENDS OF COMPONENT (A)

Example 6

The resins prepared and described in Examples 3, 4 and 5 above were mixed with a fluorosilicone fluid having vinyl chain-stopped dimethylsiloxanes containing 37 mole percent of trifluoropropylmethylsiloxane and having varying viscosities of 64,000, 104,000 and 140,000 centipoise at 25° C. The butyl acetate solvent was removed by vacuum distillation to a pot temperature of 130° C. The fluid/resin ratio is shown in the table below.

The blends were made by mixing the appropriate amounts of fluid, that is, the fluorosilicone fluid having the foregoing viscosities with resin solution. To the resulting fluid/resin blend, that is, after the resin was disbursed in the vinyl-containing polymer, and the solvent was removed, was added 15 parts per million in terms of platinum of a platinum complex which was formed by complexing platinum with a vinyl polysiloxane.

The foregoing blend containing the platinum catalyst formed component (A) of the solvent resistant room temperature vulcanizable silicone rubber compositions of the present invention.

PREPARATION OF UNFILLED ELASTOMERS

Example 7

The fluid resin blends set forth in Example 6 above were cured or vulcanized by mixing them with the amounts of hydride cross-linking agent set forth in the table below. The table shows various amounts of hydride cross-linker ranging from 3% up to 7%, based upon the amount of blend. The hydride cross-linker agents prepared in Examples 1 and 2 were each used in varying amounts with various fluid/resin blends prepared above in Example 6.

The unfilled elastomer also contained 0.1% by weight of the blend of a conventional inhibitor, tetramethyltetravinylcyclotetrasiloxane. The mixtures were placed in closed molds and pressed at about 127° C. for one hour. Almost clear, colorless elastomers resulted. The solvent resistance of the elastomers is similar to that disclosed for the elastomers in U.S. Pat. No. 4,041,010.

The properties of the elastomers resulting from the various cross-linking formulations in Examples 1 and 2 above are shown in the table below. As explained above, Example 1 is a hydride cross-linking copolymer having the composition of the present invention, and Example 2 is a hydride cross-linking copolymer having a prior art composition. The tests were conventional tests and are designated as hardness (shore A)/tensile strength (pounds per square inch)/elongation (designated as percent), and the comparisons in the table below are given in that order, that is, hardness/tensile strength/elongation. In the Table below, the resin for the particular fluid/resin blend is designated by the Example No. in which it was prepared. The crosslinking agent is also designated by the Example No. in which it was prepared. In all cases, the fluid was the fluorosilicone fluid having a vinyl chain-stopped dimethylsiloxane, and it contained 37 mole percent trifluoromethylethylenesiloxy units. In the table the varying viscosity in centipoise at 25° C. is designated under the heading "fluid".

TABLE

| Crosslinking Agent | Amount of Crosslinking Agent | *Fluid/Resin Blend | Ratio of Fluid/Resin Blend | Properties of Cured Elastomer Hardness/Tensile Str./Elong. |
|---|---|---|---|---|
| Example 1 | 6% | 104,000/Example 3 | 67/33 | 30/240/180% |
| " | 7% | 104,000/Example 3 | 67/33 | 38/380/160% |
| " | 6% | 104,000/Example 3 | " | 24/260/200% |
| " | 7% | 104,000/Example 3 | " | 36/400/190% |
| " | 4% | 104,000/Example 3 | " | 25/250/220% |
| " | 5% | 104,000/Example 3 | " | 29/270/170% |
| " | 6% | 104,000/Example 3 | " | 37/420/220% |
| Example 2 | 3% | 104,000/Example 3 | 67/33 | 36/500/240% |
| " | 3.5% | 104,000/Example 3 | " | 45/560/170% |
| " | 3% | 104,000/Example 4 | 70/30 | 42/560/180% |

*centipoise at 25° C.

It can be seen from the foregoing table that for most of the specific ratios of the various fluid/resin compositions, and for any specific amount of the hydride cross-linking copolymers of the present invention (Example 1) the unfilled, cured, elastomers generally have properties similar to those of the prior art cross-linking copolymer set forth in Example 2. It is noted that the cured elastomers made from the hydride cross-linking agents in Example 1 in accordance with the present invention, had to be used at about twice the concentration of the prior art hydride cross-linking copolymers of Example 2 to obtain equivalent cross-linking and properties. However, the advantage of using the fluorosilicone-hydride cross-linking copolymers of Example 1 is evident when the cross-linking agent is mixed with the fluid/resin blend. Clear or almost clear solutions are obtained which show no tendency to separate upon standing. The cured elastomers are also clear. This is in contrast to those compositions prepared from the hydride cross-linking copolymer of Example 2 wherein cloudy mixtures are obtained which separate upon standing. The unfilled elastomers prepared therefrom also appear cloudy or hazy.

The foregoing data indicates that the benefit derived from the use of the fluorosilicone hydride cross-linking copolymer of Example 1 is to provide a compatible reactant or cross-linking agent for the fluid/resin solutions. When they are incompatible as in those crosslinking agents designated by Example 2 in the Table, the hydride cross-linking copolymer usually separates from the other materials and does not properly cure or vulcanize the rubber.

While other modifications of the invention and variations thereof which may be employed within the scope of the invention, have not been described, the invention is intended to include such modifications as may be embraced within the following claims.

What is claimed is:

1. A solvent resistant vulcanizable silicone rubber composition comprising:
   (A) 100 parts of a mixture comprised of:
      (i) 100 parts of a vinyl-containing polymer of the formula,

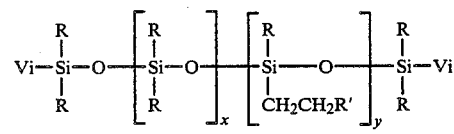

where Vi is vinyl, R is selected from the group consisting of alkyl radicals of 1 to about 8 carbon atoms and phenyl, R' is perfluoroalkyl of 1 to about 8 carbon atoms, x is at least 1, and y is at least 10, and the viscosity of the compound is at least 300 centipoise at 25° C., and the concentration of siloxy units taken y times varies from about 5 to about 98 mole percent;
      (ii) from about 10 to about 60 parts of a resin having SiO$_2$ units; a siloxane having a perfluorinated alkyl selected from the group consisting of R"SiO$_{1.5}$ units, RR"SiO units, R$_2$R"SiO$_{0.5}$ units and mixtures thereof; and vinyl-containing siloxane units selected from the group consisting of ViRR"SiO$_{0.5}$, ViR$_2$SiO$_{0.5}$, ViR"SiO, ViRSiO and mixtures thereof; where the hydrocarbon substituent to Si ratio varies from about 0.8 to about 2.4; Vi is vinyl; R is selected from the group consisting of alkyl radicals of 1 to about 8 carbon atoms and phenyl; R" is a (—CH$_2$—)$_a$R' radical where R' is perfluoroalkyl of 1 to about 8 carbon atoms, a is at least 2 but less than 10 and (—CH$_2$—)$_a$ is straight or branched chain;

(iii) a suitable amount of catalyst capable of promoting the cure of the mixture; and (B) from about 1 to about 50 parts, based on 100 parts of the mixture (A), of a crosslinking polymer having about 0.75 to about 3.0 moles of R$_2$HSiO$_{0.5}$, about 0.37 to about 1.5 moles of R"SiO$_{1.5}$, and about 0.5 to about 1.5 moles of SiO$_2$, wherein R is selected from the group consisting of alkyl radicals of 1 to about 8 carbon atoms and phenyl; and R" is a (—CH$_2$—)$_a$R' radical where R' is perfluoroalkyl of 1 to about 8 carbon atoms, a is at least 2 but less than 10, and (—CH$_2$—)$_a$ is straight or branched chain.

2. The solvent resistant vulcanizable silicone rubber composition of claim 1 further comprising up to about 100 parts of a filler.

3. The solvent resistant vulcanizable silicone rubber composition of claim 2 wherein the filler is selected from the group consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, alpha quartz, calcined clay, asbestos, carbon, graphite, cork, cotton and synthetic fibers.

4. The solvent resistant vulcanizable silicone rubber composition of claim 3 wherein the filler has been treated with a silicon compound.

5. The solvent resistant vulcanizable silicone rubber composition of claim 4 wherein the silicon compound is a silazane.

6. The solvent resistant vulcanizable silicone rubber composition of claim 1 wherein the viscosity of vinyl-containing (i) is about 1,000 to about 200,000 centipoise at 25° C.

7. The solvent resistant vulcanizable silicone rubber composition of claim 1 wherein the catalyst is platinum or a platinum compound.

8. The solvent resistant vulcanizable silicone rubber composition of claim 7 wherein the platinum catalyst is platinum complexed with a vinyl-containing polysiloxane.

9. The solvent resistant vulcanizable silicone rubber composition of claims 1, 7 or 8 wherein the catalyst comprises about 0.1 to about 50 parts per million of the total composition.

10. The solvent resistant vulcanizable silicone rubber composition of claims 1 or 2 wherein the R' of component (ii) is —CF$_3$, and a is 2.

11. The solvent resistant vulcanizable silicone rubber composition of claims 1 or 2 wherein R is —CH$_3$, and R" is —CH$_2$CH$_2$CF$_3$.

12. The solvent resistant vulcanizable silicone rubber composition of claims 1 or 2 wherein the R"SiO$_{1.5}$ units of component (ii) are derived from trifluoropropyltrichlorosilane; the RR"SiO units of component (ii) are derived from (methyl)trifluoropropyldichlorosilane; and the R$_2$R"SiO$_{0.5}$ units of component (ii) are derived from (dimethyl)trifluoropropylmonochlorosilane.

13. The solvent resistant vulcanizable silicone rubber composition of claim 1 wherein in the crosslinking polymer, R$_2$HSiO$_{0.5}$ is about 1.5 moles, R"SiO$_{1.5}$ is about 0.75 mole, and SiO$_2$ is about 1.0 mole.

14. The solvent resistant vulcanizable silicone rubber composition of claims 1 or 13 wherein the crosslinking polymer is

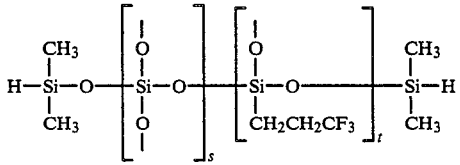

where s and t are about 10 to about 2,000, and the amount of (CH$_3$)$_2$HSi— is equal to or greater than t, and the viscosity is about 30 centipoise to about 4,000 centipoise at 25° C.

15. The solvent resistant vulcanizable silicone rubber composition of claims 1 or 13 wherein in the crosslinking polymer, R$_2$HSiO$_{0.5}$ is derived from dimethylhydrochlorosilane; R"SiO$_{1.5}$ is derived from trifluoropropyltrichlorosilane; and SiO$_2$ is derived from ethyl silicate.

16. The solvent resistant vulcanizable silicone rubber composition of claims 1 or 13 wherein the crosslinking polymer is

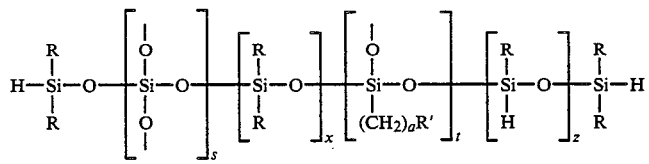

where R and R' are defined in claim 1; s and t are at least 10; and x and z are zero, a positive integer or a combination thereof, and x+z is greater than t to provide a liquid polymer.

17. A process for making solvent resistant silicone elastomers comprising:
(a) mixing:
(A) 100 parts of a mixture comprised of:
(i) 100 parts of vinyl-containing polymer of the formula,

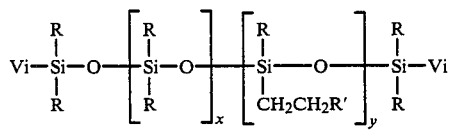

wherein Vi is vinyl, R is selected from the group consisting of alkyl radicals of 1 to about 8 carbon atoms and phenyl, R' is perfluoroalkyl of 1 to about 8 carbon atoms, x is at least 1, and y is at least 10, and the viscosity of the compound is at least 300 centipoise at 25° C., and the concentration of siloxy units taken y times varies from about 5 to about 98 mole percent;

(ii) from about 1.0 to about 60 parts of a resin having $SiO_2$ units; a siloxane having a perfluorinated alkyl selected from the group consisting of $R''SiO_{1.5}$ units, $RR''SiO$ units, $R_2R''SiO_{0.5}$ units and mixtures thereof; and vinyl-containing siloxane units selected from the group consisting of $ViRR''SiO_{0.5}$, $ViR_2SiO_{0.5}$, $ViR''SiO$, $ViRSiO$ and mixtures thereof; where the hydrocarbon substituent to Si ratio varies from about 0.8 to about 2.4; Vi is vinyl; R is selected from the group consisting of alkyl radicals of 1 to about 8 carbon atoms and phenyl; R" is a $(-CH_2-)_aR'$ radical where R' is perfluoroalkyl of 1 to about 8 carbon atoms, a is at least 2 but less than 10 and $(-CH_2-)_a$ is a straight or branched chain; and (iii) a suitable amount of catalyst capable of promoting the cure of the mixture; with (B) from about 1 to about 50 parts, based on 100 parts of the mixture (A), of a crosslinking polymer having about 0.75 to about 3.0 moles of $R_2HSiO_{0.5}$, about 0.37 to about 1.5 moles of $R''SiO_{1.5}$, and about 0.5 to about 1.5, moles of $SiO_2$, wherein R is selected from the group consisting of alkyl radicals of 1 to about 8 carbon atoms and phenyl; and R" is a $(-CH_2-)_aR'$ radical where R' is perfluoroalkyl of 1 to about 8 carbon atoms, a is at least 2 but less than 10, and $(-CH_2-)_a$ is straight or branched chain; and (b) allowing the mixture to cure.

18. The process of claim 17 further comprising adding up to about 100 parts of a filler to mixture (A).

19. The process of claim 18 wherein the filler is selected from the group consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, alpha quartz, calcined clay, asbestos, carbon, graphite, cork, cotton and synthetic fibers.

20. The process of claim 19 wherein the filler has been treated with a silicon compound.

21. The process of claim 20 wherein the silicon compound is a silazane.

22. The process of claim 17 wherein the viscosity of vinyl-containing (i) is about 1,000 to about 200,000 centipoise at 25° C.

23. The process of claim 17 wherein the catalyst is platinum or a platinum compound.

24. The process of claim 23 wherein the platinum catalyst is platinum complexed with a vinyl-containing polysiloxane.

25. The process of claims 17, 23 or 24 wherein the catalyst comprises about 0.1 to about 50 parts per million of the total composition.

26. The process of claims 17 or 18 wherein the R' of component (ii) is $-CF_3$, and a is 2.

27. The process of claims 17 or 18 wherein R is $-CH_3$, and R" is $-CH_2CH_2CF_3$.

28. The process of claims 17 or 18 wherein the $R''SiO_{1.5}$ units of component (ii) are derived from trifluoropropyltrichlorosilane; the $RR''SiO$ units of component (ii) are derived from (methyl)trifluoropropyldichlorosilane; and the $R_2R''SiO_{0.5}$ units of component (ii) are derived from (dimethyl)trifluoropropylmonochlorosilane.

29. The process of claims 17 or 18 wherein the $SiO_2$ units of the components are derived from ethyl silicate.

30. The process of claims 17 or 18 further comprising adding up to about 10,000 parts per million, based upon the total composition, of a cure inhibitor.

31. The process of claim 17 wherein in the crosslinking polymer, $R_2HSiO_{0.5}$ is about 1.5, $R''SiO_{1.5}$ is about 0.75 mole, and $SiO_2$ is about 1.0 mole.

32. The process of claims 17 or 31 wherein the crosslinking polymer, is

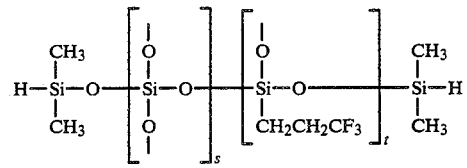

where s and t are about 10 to about 2,000, and the amount of $(CH_3)_2HSi-$ is equal to or greater than t, and the viscosity is about 30 centipoise to about 4,000 centipoise at 25° C.

33. The process of claims 17 or 31 wherein in the crosslinking polymer, $R_2HSiO_{0.5}$ is derived from dimethylchlorosilane; $R''SiO_{1.5}$ is derived from trifluoropropyltrichlorosilane; and $SiO_2$ is derived from ethyl silicate.

34. The process of claim 17 wherein the resin (ii) is derived from the catalyzed hydrolysis of a blend of a trialkylhalosilane; a vinyldialkylhalosilane; a halosilane having at least one perfluorinated carbon atom and having the formula $X_3-Si(-CH_2)_aR'$, where R' is perfluoroalkyl of 1 to about 8 carbon atoms, a is at least 2 but less than 10, $(-CH_2-)_a$ is straight chain or branched and X is a halogen; and a condensed alkyl silicate.

35. The process of claim 34 wherein the perfluorinated halosilane is trifluoropropyltrichlorosilane.

36. The process of claim 34 wherein the trialkylhalosilane is trimethylchlorosilane.

37. The process of claim 34 wherein the vinyldialkylhalosilane is vinyldimethylchorosilane.

38. The process of claims 17 or 31 wherein the crosslinking polymer is

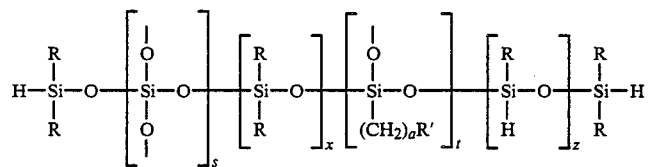
where R and R' are defined in claim 1; s and t are at least 10; and x and z are zero, a positive integer or a combination thereof, and x+z is greater than t to provide a liquid polymer.
* * * * *